(12) United States Patent
Merlin

(10) Patent No.: US 6,415,134 B1
(45) Date of Patent: Jul. 2, 2002

(54) TRANSPONDER COMMUNICATION STATION PROVIDED WITH A TRANSMISSION COIL CONFIGURATION WITH TWO TRANSMISSION COILS

(75) Inventor: Erich Merlin, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/474,296

(22) Filed: Dec. 29, 1999

(30) Foreign Application Priority Data

Dec. 30, 1998 (EP) .............................. 98890381

(51) Int. Cl.[7] .................................. H04B 5/00
(52) U.S. Cl. ..................... 455/41; 455/73; 455/106; 455/276.1
(58) Field of Search ................... 455/41, 73, 106, 455/276.1, 101, 42, 211; 342/42, 43, 44, 51, 50; 340/572.5, 572.2, 572.7

(56) References Cited

U.S. PATENT DOCUMENTS 5,594,448 A * 1/1997 d'Hont et al. ............... 342/44
6,154,635 A * 11/2000 Ohta et al. ................... 455/41
6,167,236 A * 12/2000 Kaiser et al. ................ 455/41
6,219,530 B1 * 4/2001 Raggam et al. ............. 455/41

* cited by examiner

*Primary Examiner*—Vivian Chin
*Assistant Examiner*—John J Lee
(74) *Attorney, Agent, or Firm*—Aaron Waxler

(57) ABSTRACT

A communication station (1) for contactless communication with at least one transponder is provided with a transmission coil configuration (2) with an active, first transmission coil circuit (21) which includes a first transmission coil (36) and with a passive, second transmission coil circuit (22) which includes a second transmission coil (42), the first transmission coil (36) as well as the second transmission coil (42) being connected to a respective central conductor (38, 50) which is connected, via a third capacitor stage (41, 53), to a connection conductor (33, 48) between two series-connected capacitor stages (31, 32 and 47, 49), the two capacitor stages (31, 32 and 47, 49) constituting capacitor means (30, 43) which are connected parallel to the relevant transmission coil (36, 42).

10 Claims, 1 Drawing Sheet

TRANSPONDER COMMUNICATION STATION PROVIDED WITH A TRANSMISSION COIL CONFIGURATION WITH TWO TRANSMISSION COILS

BACKGROUND OF THE INVENTION

1. Field of the Invention

The invention relates to a communication station which is arranged for wireless communication with at least one transponder and which includes carrier signal generating means whereby a carrier signal having a given frequency can be generated, which carrier signal can be modulated by the transponder during the wireless communication with a transponder, thus forming a modulated carrier signal which has a sideband in the range of a sideband frequency. The communication station also includes a transmission coil configuration with an active, first transmission coil circuit which has a flat, first transmission coil wherethrough a coil current can be driven, with first capacitor means connected in parallel with the first transmission coil, and with a passive, second transmission coil circuit which has a flat, second transmission coil which is oriented so as to extend essentially parallel to the first transmission coil, is arranged opposite the first transmission coil and is inductively coupled to the first transmission coil. The inductive coupling to the first transmission coil results in a coil current which is shifted essentially 90° relative to the coil current that can be driven through the first transmission coil to be driven through the second transmission coil. Second capacitor means are connected parallel with the second transmission coil, and has a resonant frequency in the range of the carrier signal frequency.

The invention also relates to a transmission coil assembly for use in a communication station for wireless communication with at least one transponder, and which is provided with an active, first transmission coil having a flat, first transmission coil wherethrough a coil current can be driven, first capacitor means connected in parallel with the first transmission coil, and a passive, second transmission coil circuit having a flat, second transmission coil which is oriented so as to extend essentially parallel to the first transmission coil. The second transmission opposite the first transmission coil and is inductively coupled there to the inductive coupling resulting in a coil current in the second transmission coil which has been phase shifted essentially 90° relative to the coil current in the first transmission coil. Second capacitor means are connected in parallel with the second transmission coil, and has a resonant frequency in the range of the frequency of a carrier signal which can be modulated by the transponder during the wireless communication with a transponder, resulting in a modulated carrier signal which has a sideband in the range of a sideband frequency.

2. Description of Related Art

Various versions of a communication station of the kind described in the first paragraph and of a transmission coil configuration of the kind described in the second paragraph are already commercially available and used in practice.

In communication stations and transmission coil configurations it is always necessary to achieve an as high as possible degree of recognition reliability, i.e. to recognize any transponder entering the communication range of such a communication station and such a transmission coil configuration with a high degree of reliability, and to achieve an as high as possible degree of communication dependability, i.e. to communicate with such a transponder with a high degree of dependability. Even though in many cases a high degree of recognition reliability and communication dependability are achieved by the known communication station and the known transmission coil configuration, it has been found that for many applications and in many situations the recognition reliability and communication dependability that can be achieved are not satisfactory. The causes of such unsatisfactory functionality will be briefly elucidated hereinafter.

The known communication station and the known transmission coil configuration involve a continuously varying magnetic field distribution, because the coil currents through the active transmission coil and through the passive transmission coil exhibit a phase shift of 90° relative to one another. The passive, second transmission coil circuit is tuned to a carrier signal frequency f1 which preferably amounts to 13.56 MHz. When a transponder enters the communication range, i.e. the magnetic field range between the first transmission coil and the second transmission coil, the transponder is supplied, via the carrier signal, with an adequate amount of energy required by the transponder in order to generate a response signal. The response signal is obtained by load modulation of the carrier signal, said load modulation causing amplitude modulation of the carrier signal so that there is formed an amplitude modulated carrier signal which has a sideband in the range of the sideband frequency f2 which preferably lies at approximately 14.0 MHz. When the transponder is situated nearer to the active, first transmission coil, the sideband in the range of the sideband frequency f2 is subject to a given resonance step-up which occurs due to the quality factor and the compensation circuit of the active, first transmission coil circuit. The level of the response signal received in the communication station is determined in that the transponder causes a small current variation in the active first transmission coil, which current variation causes a comparatively large voltage variation due to the resonance step-up at the sideband frequency f2; such a voltage variation can be suitably detected by receiving means of the communication station. However, if a transponder is situated nearer to the passive, second transmission coil, the same events take place as in the vicinity of the first transmission coil, but practically no resonance step-up at the sideband frequency f2 occurs for the passive, second transmission coil circuit. Consequently, a small current variation produced in the passive, second transmission coil causes only a small voltage variation, because the resonance step-up is practically absent or only very small via the inductive coupling between the passive, second transmission coil and the active, first transmission coil, such a small voltage variation causes only a comparatively small current variation in the active, first transmission coil, which itself becomes manifest as an only comparatively small voltage variation in the active, first transmission coil circuit. Consequently, when a transponder is situated nearer to the passive, second transmission coil circuit, the response signal applied to the receiving means of the communication station is substantially smaller than in the situation where a transponder is situated nearer to the active, first transmission coil circuit.

SUMMARY OF THE INVENTION

It is an object of the invention to eliminate the above described problems and to realize an improved communication station and an improved transmission coil configuration in which an equally good response signal is obtained in practically all operating situations, so that equally good and high recognition reliability and an equally good and high communication dependability.

In order to achieve the described object a communication station of the kind described in the first paragraph is according to the invention, characterized in that the first capacitor means and the second capacitor means both consist of a first capacitor stage and a second capacitor stage which are connected in series and connected to one another via a connection conductor, the first transmission coil circuit and the second transmission coil circuit both include a central conductor, a first end of which is connected to a central region of the relevant transmission coil and the second end of which is connected, via a third capacitor stage, to the connection conductor between the first capacitor stage and the second capacitor stage. In the second transmission coil circuit a resonance step-up is realized at the carrier signal frequency by means of the first capacitor stage and the second capacitor stage, and in the second transmission coil circuit a resonance step-up is realized at the sideband frequency by means of the third capacitor stage.

In order to achieve the described object a transmission coil configuration of the kind described the second paragraph is, according to the invention characterized in that the first capacitor means and the second capacitor means both consist of a first capacitor stage and a second capacitor stage which are connected in series and interconnected via a connection conductor. The first transmission coil circuit and the second transmission coil circuit both include a central conductor, a first end of which is connected to a central region of the relevant transmission coil and the second end of which is connected, via a third capacitor stage, to the connection conductor between the first capacitor stage and the second capacitor stage. In the second transmission coil circuit a resonance step-up is realized at the carrier signal frequency by means of the first capacitor stage and the second capacitor stage, and in the second transmission coil circuit a resonance step-up is realized at the sideband frequency by means of the third capacitor stage.

By taking the steps according to the invention it is achieved, while using very simple means and spending only little additional effort, that a resonance step-up is obtained at the sideband frequency in the passive, second transmission coil circuit; this offers the advantage that even a comparatively small current variation in the second transmission coil of the passive, second transmission coil circuit causes a comparatively large voltage variation due to the resonance step-up at the sideband frequency, which voltage variation is suitably transferred, by way of the inductive coupling, to the active, first transmission coil and hence can be suitably received and processed by means of receiving means connected to the active, first transmission coil circuit.

Each of the two central conductors in a communication station according to the invention and a transmission coil configuration according to the invention may be connected, by way of its first end, to the relevant transmission coil in a region other than the center thereof; such non-symmetry in the transmission coil circuits can be compensated for by means of unequal first and second capacitor stages. However, it has been found very advantageous to provide, a perfectly symmetrical construction of the transmission coil circuits while using particularly simple means; this has proven to be a major advantage in practice.

It has also been found in practice that it is also very advantageous to enable accurate tuning to the desired frequencies, for example the carrier signal frequency and the sideband frequency.

It has also been found to be very advantageous to provide amplitude matching of the coil current in the passive, second transmission coil with the coil current in the active, first transmission coil.

The foregoing aspects and further aspects of the invention are apparent from and will be elucidated with reference to the following embodiments.

BRIEF DESCRIPTION OF THE DRAWINGS

The invention will be,described in detail hereinafter on the basis of the embodiment which is shown in the drawings, however without the invention being restricted thereto.

DESCRIPTION OF THE PREFERRED EMBODIMENTS

Figure 1:
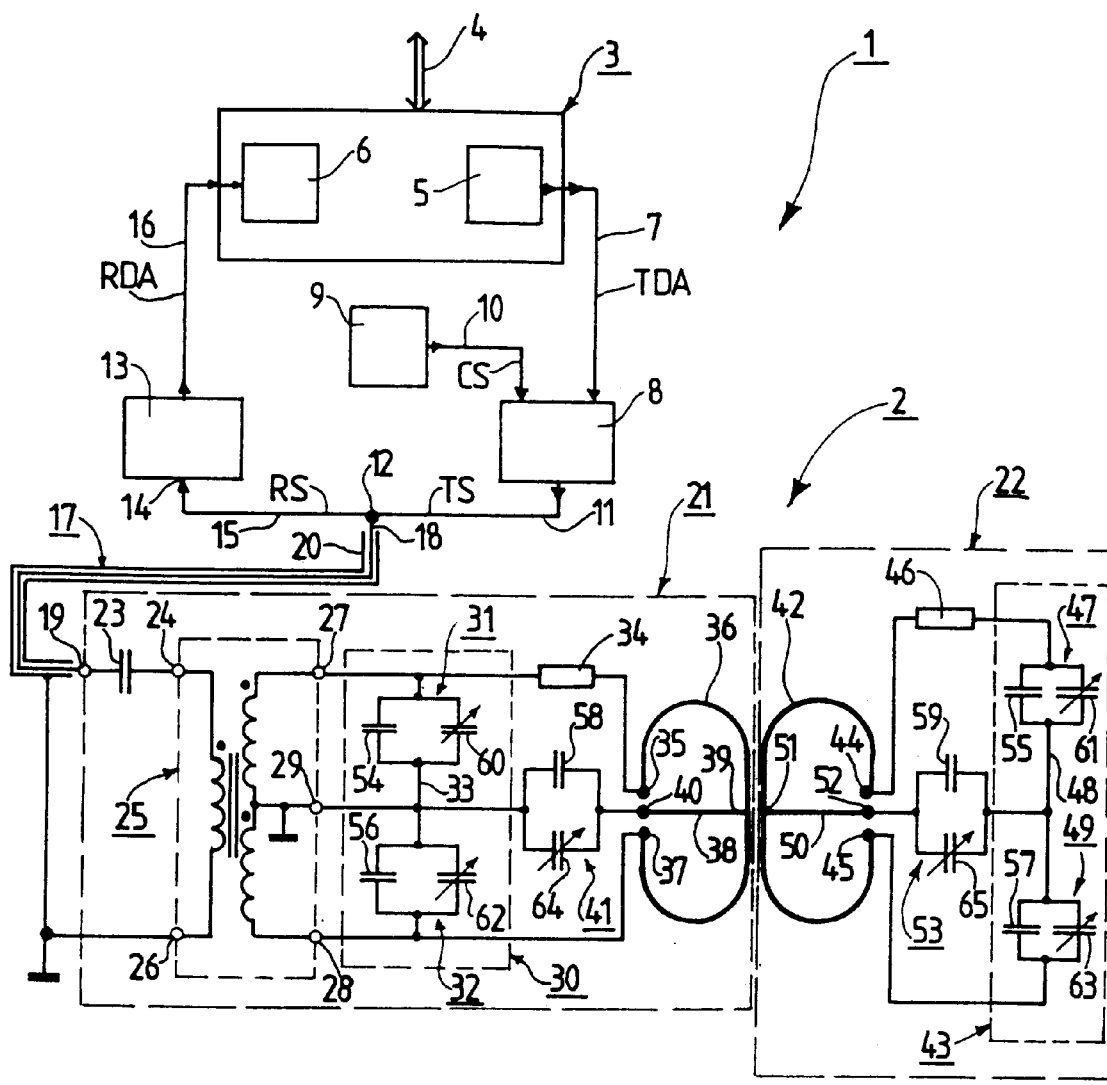
FIG. 1 shows diagrammatically, partly in the form of a block diagram, an embodiment of a communication station according to the invention which is provided with of a transmission coil configuration according to the invention.

FIG. 1 shows a communication station 1 which is arranged for wireless communication with at least one transponder (not shown) and is provided with a transmission coil configuration 2 which is intended for use in conjunction with the communication station 1.

The communication station 1 includes a microcomputer 3 which is capable of co-operating, for example, with an external personal computer (PC) via a diagrammatically represented BUS connection 4. The microcomputer 3 implements data generating means 5 and data evaluation means 6. The data generating means 5 are capable of generating data TDA in the form of data blocks or data words to be transmitted. Data TDA to be transmitted, generated by the data generating means 5, can be applied, via an electrically conductive connection 7, to modulation means 8 in which a carrier signal CS with a given carrier signal frequency f1 of, for example, approximately 13.56 MHz is amplitude modulated in dependence on the generated data TDA to be transmitted.

In order to generate said carrier signal CS, the communication station 1 is provided with carrier signal generating means 9 whereby the carrier signal CS having the carrier signal frequency f1 of approximately 13.56 MHz can be generated. It is to be noted that the carrier signal CS can be modulated by the transponder during the wireless communication with a transponder, resulting in a modulated carrier signal which has a sideband in the range of a sideband frequency f2, said sideband frequency f2 amounting to approximately 14.0 MHz in the present case.

The carrier signal CS generated by means of the carrier signal generating means 9 is applied to the modulator means 8 via an electrically conductive connection 10. The modulator means 8 amplitude modulate the carrier signal CS in dependence on the respective data TDA to be transmitted. The modulator means 8 generate a transmission signal TS which is applied to a terminal 12 of the communication station 1 via a conductor 11.

The communication station 1 is also provided with receiving means 13 whose input 14 is connected to the terminal 12 via a conductor 15. The receiving means 13 receive and process a received signal RS which is presented at the terminal 12. The received signal RS is formed by an amplitude modulated carrier signal, the amplitude modulation being achieved by load modulation of the carrier signal CS by means of a transponder communicating with the communication station 1. During such load modulation, the carrier signal CS generated by the carrier signal generating means 9 is applied, via the connection 10, to the modulation means 8 and from the modulation means 8, in non-modulated form and via the connection 11, to the terminal 12 and from the terminal 12 to an active, first transmission coil circuit; as a result, the amplitude modulated carrier signal, constituting the received signal RS, is obtained at the terminal 12 under the load-modulating influence of the transponder.

The received signal RS obtained at the terminal 12 is applied to the input 14 of the receiving means 13 via the connection 15. The receiving means 13 demodulate the amplitude modulated carrier signal, so the received signal RS, received data RDA being obtained after such demodulation. At the output side the receiving means 13 are connected, via a conductor 16, to the data evaluation means 6 which are implemented by means of the microcomputer and are capable of evaluating the received data RDA.

A coaxial cable 17 is connected to the terminal 12 in the communication station 1, said coaxial cable having a nominal characteristic impedance of 50 ohms; its inner conductor 18 is connected to a further terminal 19 while its outer conductor 20 is connected to ground.

The transmission coil configuration 2 is provided with an active, first transmission coil circuit 21 and a passive, second transmission coil circuit 22.

The active, first transmission coil circuit 21 is connected to the further terminal 19. The first transmission coil circuit 21 includes a capacitor 23 which is connected in series with the further terminal 19. An input 24 of a so-called balun 25 is connected to the capacitor 23, the second input 26 of said balun being connected to ground. The balun 25 has a first output 27, a second output 28 as well as a third output 29 which is connected to a tapping of the balun 25. A balun 25 of this kind has since long been known. In the present example the balun serves mainly to achieve impedance matching and to adapt the asymmetrical conditions in the region of the coaxial cable 17 to the symmetrical conditions in the region beyond the balun 25, and to prevent the occurrence of earth currents flowing via ground. The communication station 1 may also be provided with baluns of a different construction, for example a Ruthroff balun. However, the invention can also be implemented without utilizing a balun.

The first transmission coil circuit 21 includes first capacitor means 30 which consist of a first capacitor stage 31 and a second capacitor stage 32 which are connected in series and are connected to one another via a conductor 33. The conductor 33 is connected to the third output 29 of the balun 25. The terminal of the first capacitor stage 31 which is remote from the connection conductor 33 is connected to the first output 27 of the balun 25. The terminal of the second capacitor stage 32 which is remote from the connection conductor 33 is connected to the second output 28 of the balun 25.

Furthermore, a first coil terminal 35 of a flat, first transmission coil 36 is connected, via a damping resistor 34, to the first output 27 of the balun 25, the second coil terminal 37 thereof in this case being connected directly to the second output 28 of the balun 25. Furthermore, a second damping resistor could also be connected between the second output 28 of the balun 25 and the second coil terminal 37 of the first transmission coil 36. The first capacitor means 30 are connected in parallel with the first transmission coil 36.

The first transmission coil circuit 21 includes a central conductor 38, a first end 39 of which is connected to a central region of the first transmission coil 36, being exactly the center of the first transmission coil 36 in the present case, whereas its second end 40 is connected, via a third capacitor stage 41, to the connection conductor 33 between the first capacitor stage 31 and the second capacitor stage 32.

The passive, second transmission coil 22 includes a flat, second transmission coil 42 which is oriented so as to extend in space essentially parallel to the first transmission coil 36 and opposite thereto said second transmission coil 42 being inductively coupled to the first transmission coil 36. A coil current can be driven through the first modulator coil 36 essentially by means of the transmission means 8. Because of the inductive coupling to the first transmission coil 36, a coil current which has been phase shifted essentially 90° with respect to the coil current in the first transmission coil 36 is driven through the second transmission coil 42.

The second transmission coil circuit 22 includes second capacitor means 43 which are connected parallel to the second transmission coil 42. The second transmission coil circuit 22 has a resonant frequency which is determined essentially by the second transmission coil 42 and the capacitor means 43 and lies in the range of the carrier signal frequency f1 of the carrier signal CS.

The second transmission coil 42 has a first coil terminal 44 and a second coil terminal 45. The first coil terminal 44 is connected to a damping resistor 46, the other side of which is connected to a first capacitor stage 47 of the second capacitor means 43. The first capacitor stage 47 is connected, via a conductor 48, to a second capacitor stage 49 of the second capacitor means 43, the other side of which is connected to the second coil terminal 45.

Like the first transmission coil circuit 21, the second transmission coil circuit 22 is provided with a central conductor 50 which is connected, by way of its first end 51, to a central region of the second transmission coil 42, being exactly the center of the second transmission coil 42 in the present case, whereas its second end 52 is connected, via a third capacitor stage 53, to the connection conductor 48 between the first capacitor stage 47 and the second capacitor stage 49.

Figure 2:
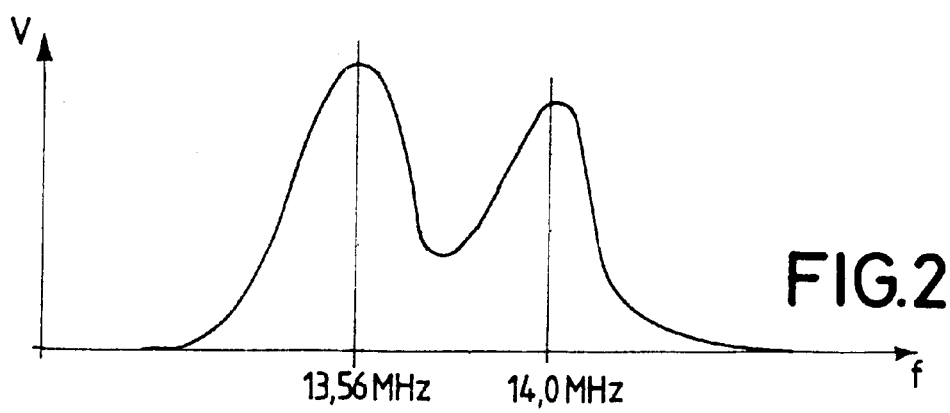
FIG. 2 shows a diagram illustrating the frequency variation of the voltage across the transmission coil of the passive, second transmission coil circuit of the transmission coil configuration of the communication station shown in FIG. 1.

In the second transmission coil circuit 22 a resonance step-up can be realized at the carrier signal frequency f1 while utilizing the second transmission coil 42 and the first capacitor stage 47 and the second capacitor stage 49. Furthermore, in the second transmission coil circuit 22 a resonance step-up can be realized at the sideband frequency f2 while utilizing the central conductor 50 and the third capacitor stage 53. In this context reference is made to FIG. 2 which illustrates the frequency variation of a voltage occurring in the second transmission coil circuit 22.

Preferably, a respective central conductor 38, 50 is provided in the first transmission coil circuit 21 as well as in the second transmission coil circuit 22, the respective first ends 39, 51 thereof being connected exactly to the center of the relevant transmission coil 36 or 42. Furthermore, the first capacitor stage 31 or 47 and the second capacitor stage 32 or 49 of the first capacitor means 30 as well as the second capacitor means 43 preferably have equally high capacitance values.

In the communication station 1 the first capacitor stage 31 or 47 and the second capacitor stage 32 or 49 of the first capacitor means 30 as well as of the second capacitor means 43 and the third capacitor stage 41 or 43 of the first transmission coil circuit 21 as well as of the second transmission coil circuit 22 consist of a respective capacitor 54, 55, 56, 57, 58 and 59, respectively, having a fixed capacitance value, and of a respective trimmer capacitor 60, 61, 62, 63, 64 and 65, respectively, having a variable capacitance value.

With respect to the two transmission coils 36 and 42 and their central conductors 38 and 50 it is also to be noted that these electrical components can be realized, for example by means of a copper tube. However, it has been found to be simpler and less expensive when the two transmission coils 36 and 42 and the two central conductors 38 and 50 are formed by the external conductor of a coaxial cable; it has been found in practice that it is advantageous to use a coaxial cable having a diameter of approximately 1 cm. The flat transmission coils 36 and 42 may have different geometrical shapes; for example, they may be constructed so as to have an essentially circular, elliptical, oval, triangular, rectangular or square shape. In the case of a circular shape it has been found that the transmission coil diameter preferably amounts to approximately 60 cm.

What is claimed is:

1. A communication station for wireless communication with at least one transponder, said communication station comprising:

modulating means for generating a carrier signal at a carrier frequency (f1), which signal upon reception by said transponder is modulated thereby to form a modulated carrier signal having a sideband frequency (f2);

an active first transmission coil circuit (21) having a first transmission coil (36), and a passive second transmission coil circuit (22) having a second transmission coil (42), the first and second transmission coils being inductively coupled so that a current in the first transmission coil induces a 90° phase shifted current in the second transmission coil; and first and second capacitor means (30, 43) respectively coupled in parallel with the first and second transmission coils (36, 42), the parallel combination of the second capacitor means and second transmission coil having a resonant frequency substantially corresponding to said carrier frequency (f1);

characterized in that:

the first and second capacitor means (30, 43) each consist of first and second capacitor stages (31, 32 and 47, 49) which are connected in series to a common connection point, which connection point is also connected via a third capacitor stage (41, 53) to the relevant one of the inductively coupled transmission coils (36, 42);

a resonance step-up at the carrier signal frequency (f1) can be achieved in the second transmission coil circuit (22) by adjustment of the capacitances of the first and second capacitor stages thereof (47, 49); and a resonance step-up at the sideband frequency (f2) can be achieved in the second transmission coil circuit (22) by adjustment of the capacitance of the third capacitor stage (53) thereof.

2. A communication station (1) as claimed in claim 1, characterized in that the first transmission coil circuit (21) and the second transmission coil circuit (22) both include a central conductor (38, 50), a first end (39, 51) of which is connected exactly to the center of the relevant transmission coil (36, 42), and that the first capacitor stage (31, 47) and the second capacitor stage (32, 49) of the first capacitor means (30) as well as of the second capacitor means (43) have equally high capacitance values.

3. A communication station (1) as claimed in claim 1, characterized in that the first capacitor stage (31, 47) and the second capacitor stage (32, 49) of the first capacitor means (30) as well as of the second capacitor means (43) consist of a respective capacitor (54, 55, 56, 57) having a fixed capacitance value and of a respective trimmer capacitor (60, 61, 62, 63) having a variable capacitance value.

4. A communication station (1) as claimed in claim 1, characterized in that the third capacitor stage (41, 53) of the first transmission coil circuit (21) as well as of the second transmission coil circuit (22) consists of a respective capacitor (58, 59) having a fixed capacitance value and of a respective trimmer capacitor (64, 65) having a variable capacitance value.

5. A communication station (1) as claimed in claim 1 characterized in that in the second transmission coil circuit (22) an ohmic resistor (46) is connected between at least one of the first capacitor stage (47) and the second capacitor stage (49) on the one side and the second transmission coil (42) on the other side.

6. A transmission coil assembly for use in a communication station which provides wireless communication with at least one transponder, said communication station including modulating means for generating a carrier signal at a carrier frequency (f1), which signal upon reception by said transponder is modulated thereby to form a modulated carrier signal having a sideband frequency (f2); said coil assembly comprising:

an active first transmission coil circuit (21) having a first transmission coil (36), and a passive second transmission coil circuit (22) having a second transmission coil (42), the first and second transmission coils being inductively coupled so that a current in the first transmission coil induces a 9020 phase shifted current in the second transmission coil; and first and second capacitor means (30, 43) respectively coupled in parallel with the first and second transmission coils (36, 42), the parallel combination of the second capacitor means and second transmission coil having a resonant frequency substantially corresponding to said carrier frequency (f1);

characterized in that:

the first and second capacitor means (30, 43) each consist of first and second capacitor stages (31, 32 and 47, 49) which are connected in series to a common connection point, which connection point is also connected via a third capacitor stage (41, 53) to the relevant one of the inductively coupled transmission coils (36, 42);

a resonance step-up at the carrier signal frequency (f1) can be achieved in the second transmission coil circuit (22) by adjustment of the capacitances of the first and second capacitor stages thereof (47, 49); and a resonance step-up at the sideband frequency (f2) can be achieved in the second transmission coil circuit (22) by adjustment of the capacitance of the third capacitor stage (53) thereof.

7. A transmission coil configuration (2) as claimed in claims 6, characterized in that the first transmission coil circuit (21) and the second transmission coil circuit (22) both include a central conductor (38, 50), a first end (39, 51) of which is connected exactly to the center of the relevant transmission coil (36, 42), and that the first capacitor stage (31, 47) and the second capacitor stage (32, 49) of the first capacitor means (30) as well as of the second capacitor means (43) have equally high capacitance values.

8. A transmission coil configuration (2) as claimed in claim 6, characterized in that the first capacitor stage (31, 47) and the second capacitor stage (32, 49) of the first capacitor means (30) as well as of the second capacitor means (43) consist of a respective capacitor (54, 55, 56, 57) having a fixed capacitance value and of a respective trimmer capacitor (60, 61, 62, 63) having a variable capacitance value.

9. A transmission coil configuration (2) as claimed in claim 6, characterized in that the third capacitor stage (41, 53) of the first transmission coil circuit (21) as well as of the second transmission coil circuit (22) consists of a respective capacitor (58, 59) having a fixed capacitance value and of a respective trimmer capacitor (64, 65) having a variable capacitance value.

10. A transmission coil configuration (2) as claimed in claim 6, characterized in that in the second transmission coil circuit (22) an ohmic resistor (46) is connected between at least one of the first capacitor stage (47) and the second capacitor stage (49) on the one side and the second transmission coil (42) on the other side.

* * * * *